United States Patent
Christo et al.

(10) Patent No.: US 10,831,939 B2
(45) Date of Patent: Nov. 10, 2020

(54) PRINTED CIRCUIT BOARD DESIGN

(71) Applicant: INTERNATIONAL BUSINESS MACHINES CORPORATION, Armonk, NY (US)

(72) Inventors: Michael A. Christo, Round Rock, TX (US); David Green, Austin, TX (US); Julio A. Maldonado, Austin, TX (US); Diana D. Zurovetz, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 16/216,613

(22) Filed: Dec. 11, 2018

(65) Prior Publication Data
US 2020/0184034 A1 Jun. 11, 2020

(51) Int. Cl.
*G06F 30/10* (2020.01)
*H05K 5/00* (2006.01)
(Continued)

(52) U.S. Cl.
CPC .............. *G06F 30/10* (2020.01); *G06F 30/00* (2020.01); *G06F 30/18* (2020.01); *G06F 30/39* (2020.01);
(Continued)

(58) Field of Classification Search
CPC .............. G06F 11/3636; G06F 11/261; G06F 11/3466; G06F 11/3632; G06F 30/398; G06F 30/3323; G06F 30/367; G06F 30/39; G06F 30/18; G06F 16/20; G06F 16/7837; G06F 16/7854; G06F 2111/02; G06F 2115/08; G06F 30/30; G06F 30/10; G06F 2115/12; G06F 2111/04; G06F 2111/20;
(Continued)

(56) References Cited

U.S. PATENT DOCUMENTS 5,787,006 A * 7/1998 Chevallier ............ G06F 30/398
716/111
6,578,174 B2 * 6/2003 Zizzo ...................... G06F 30/30
716/103
(Continued)

FOREIGN PATENT DOCUMENTS

| EP | 0654745 | 5/1995 |
|---|---|---|
| JP | 2003256486 | 9/2003 |
| WO | 2016018317 | 2/2016 |

*Primary Examiner* — Helen Rossoshek
(74) *Attorney, Agent, or Firm* — Kunzler Bean & Adamson; Bruce R. Needham

(57) ABSTRACT

For printed circuit board ("PCB") design, methods, systems, and apparatuses are disclosed. One apparatus includes a component ID module that identifies a PCB component to be placed on a current board design; a search module that displays one or more instances of previous board designs containing the identified PCB component, wherein displaying the one or more instances of previous board designs containing the identified PCB component comprises displaying a region surrounding the identified PCB component; and an import module that imports a selected portion of a board design into the current board design from a selected one of the instances of previous board designs containing the identified PCB component.

19 Claims, 10 Drawing Sheets

(51) Int. Cl.
*G06F 30/39* (2020.01)
*G06F 30/18* (2020.01)
*G06F 30/00* (2020.01)
G06F 111/20 (2020.01)
G06F 111/04 (2020.01)
G06F 115/12 (2020.01)
H05K 3/00 (2006.01)

(52) U.S. Cl.
CPC ........ H05K 5/0069 (2013.01); *G06F 2111/04* (2020.01); *G06F 2111/20* (2020.01); *G06F 2115/12* (2020.01); *H05K 3/0005* (2013.01)

(58) Field of Classification Search
CPC ............ G06F 30/00; H05K 2203/0173; H05K 3/0005; H05K 5/0069
See application file for complete search history.

(56) References Cited

U.S. PATENT DOCUMENTS

| | | | |
|---|---|---|---|
| 6,701,289 B1* | 3/2004 | Garnett | G06F 30/39 703/14 |
| 7,114,132 B2 | 9/2006 | Yaguchi | |
| 7,409,666 B2* | 8/2008 | Almeida | G06F 30/39 716/137 |
| 7,712,058 B2 | 5/2010 | Brathwaite et al. | |
| 8,065,654 B2* | 11/2011 | Shiihara | G06F 30/30 716/139 |
| 8,627,248 B1 | 1/2014 | Shao et al. | |
| 8,893,069 B2 | 11/2014 | Su et al. | |
| 8,914,762 B1 | 12/2014 | Sinclair et al. | |
| 2002/0157067 A1* | 10/2002 | Yaguchi | G06F 30/39 716/115 |
| 2003/0028630 A1* | 2/2003 | Bischof | G06F 30/18 709/223 |
| 2003/0220920 A1* | 11/2003 | Lake | G06F 16/20 |
| 2005/0114865 A1* | 5/2005 | Petunin | G06F 30/39 719/310 |
| 2011/0035720 A1 | 2/2011 | Suiter et al. | |
| 2011/0113394 A1* | 5/2011 | Woods | G06F 30/398 716/106 |
| 2012/0323352 A1* | 12/2012 | Groth | H05K 7/1434 700/98 |
| 2015/0178650 A1 | 6/2015 | Jandhyala et al. | |
| 2016/0085898 A1 | 3/2016 | Manohar et al. | |
| 2017/0011160 A1 | 1/2017 | Baek et al. | |
| 2017/0016780 A1 | 1/2017 | Kobayashi et al. | |
| 2017/0124246 A1 | 5/2017 | Benedict et al. | |
| 2018/0343746 A1* | 11/2018 | Lin | H05K 3/30 |

* cited by examiner

PRINTED CIRCUIT BOARD DESIGN

BACKGROUND

The subject matter disclosed herein relates to printed circuit board layout and more particularly relates to importing a portion of a PCB design.

Often times in the PCB design process identical components and layout features are reused in different card designs across multiple system platforms. In effect, to reuse design features requires the designer to first find the design feature on a previous design, which may not be stored locally. Also, the designer may have to search multiple designs to find the feature they desire.

SUMMARY

Apparatuses for importing a printed circuit board ("PCB") component are disclosed. Computer-implemented methods also perform the functions of the apparatuses. According to an embodiment of the present invention, an apparatus for importing a PCB component includes a component ID module that identifies a PCB component to be placed on a current board design. The apparatus includes a search module that displays one or more instances of previous board designs containing the identified PCB component, wherein displaying the one or more instances of previous board designs containing the identified PCB component includes displaying a region surrounding the identified PCB component. The apparatus includes an import module that imports a selected portion of a board design into the current board design from a selected one of the instances of previous board designs containing the identified PCB component. In some embodiments, at least a portion of the modules include hardware circuits, a programmable hardware device and/or executable code, where the executable code is stored on one or more computer readable storage media.

According to an embodiment of the present invention, a computer-implemented method for PCB design includes identifying a PCB component to be placed on a current board design and displaying one or more instances of previous board designs containing the identified PCB component. Here, displaying the one or more instances of previous board designs containing the identified PCB component includes displaying a region surrounding the identified PCB component. The method includes importing a selected portion of a board design into the current board design from a selected one of the instances of previous board designs containing the identified PCB component.

According to another embodiment of the present invention, a computer program product for PCB design includes a computer readable storage medium having program instructions embodied therewith. Here, the program instructions executable by a processor to cause the processor to: identify a PCB component to be placed on a current board design, display one or more instances of previous board designs containing the identified PCB component, and import a selected portion of a board design into the current board design from a selected one of the instances of previous board designs containing the identified PCB component. Here, displaying the one or more instances of previous board designs containing the identified PCB component includes displaying a region surrounding the identified PCB component.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
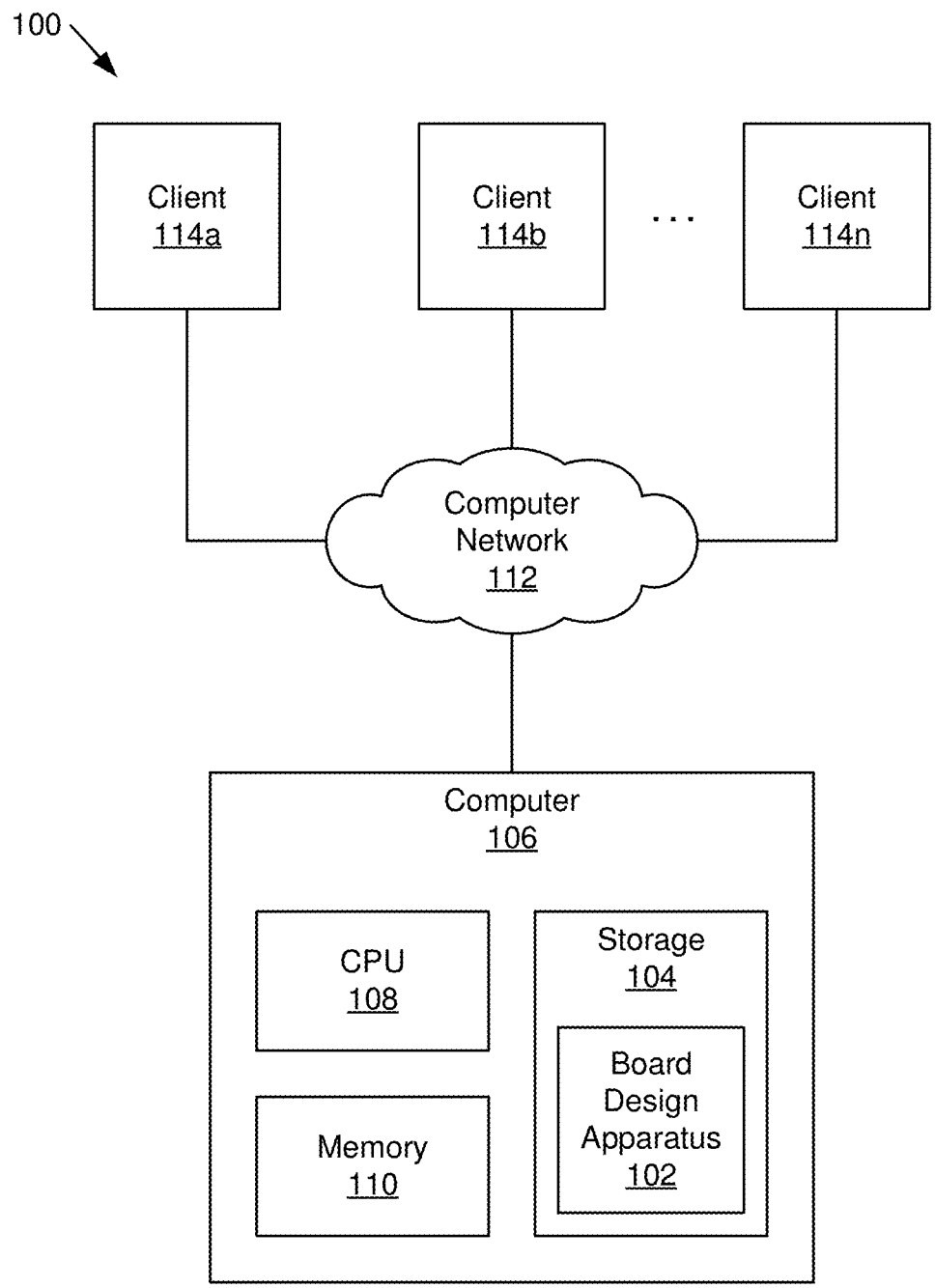
FIG. 1 is a block diagram illustrating one embodiment of a system for importing a PCB component into a board design.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

Typically, once a logic design is complete for an electronic circuit design, a next step is to place the components on a PCB, which can be a daunting, tedious task. Often times in the PCB design process identical components and layout features are reused in different card designs across multiple system platforms. Component design features for board designs can be copied from other existing board files. In various embodiments, the board design tool has access to cloud-based designs, as well as access to the local computer level and/or local storage server level. Beneficially, copying features from existing board files minimizes the need to qualify new designs and/or layout features, thus saving development time and expense. In certain embodiments, only verified design layouts are searched for PCB components, subcomponents, layout features, etc.

In effect, to reuse design features requires the designer to first find the design feature which is often times on another designer's personal computer or general purpose storage server. Also, the designer may have to search multiple designs to find the feature they desire. Moreover, each component typically has constraints. The constraints may be trace length, height restrictions, propagation delay, and the like. Each component connected to another component should be placed to comply with the various component constraints.

A component may be parent component and may also be a child component. A parent-child component relationship includes a connection between components. For example, a child component is connected to an output of a parent component. In another example, a signal from a parent component flows to a child component. In another example, a parent component is a more complex component, which may be called module, and is connected to child components that support the parent component. For example, a parent component or module may be a processor module, a clock generator, a universal serial bus ("USB") host controller or other similar complex components. A child component may be a resistor, a capacitor, an inductor, a transistor, etc. In other embodiments, a parent component is connected to another parent component.

In another example, a parent component is a selected component while a child component is defined by a connection to the selected parent component. For example, a user may select a processor module that is connected to resistors, capacitors, etc., which may be connected to the processor module to set timing limits, create ramp signals, select processor options, and which may also connect to other components. Once the parent component, which is a processor module in this case is placed, a user may then select a child component, such as a resistor, for further placement, which may then become a parent component to one or more other components to which the resistor is connected. The one or more other components then become child components for the resistor. One of skill in the art will recognize other parent-child relationships useful to the board design.

According to an embodiment of the present invention, an apparatus for importing a PCB component includes a component ID module that identifies a PCB component to be placed on a current board design. The apparatus includes a search module that displays one or more instances of previous board designs containing the identified PCB component, wherein displaying the one or more instances of previous board designs containing the identified PCB component includes displaying a region surrounding the identified PCB component. The apparatus includes an import module that imports a selected portion of a board design into the current board design from a selected one of the instances of previous board designs containing the identified PCB component. In some embodiments, at least a portion of the modules include hardware circuits, a programmable hardware device and/or executable code, where the executable code is stored on one or more computer readable storage media.

In some embodiments, importing the selected portion of a board design into the current board design may include the import module importing a matching PCB component in the selected instance of a previous board design and at least one of: a wiring feature associated with the matching PCB component and a layout feature associated with the matching PCB component. In some embodiments, importing the selected portion of a board design into the current board design comprises the import module importing at least one of: a wiring feature associated with a matching PCB component in the selected instance of a previous board design and a layout feature associated with the matching PCB component.

In some embodiments, the apparatus includes a selection module that receives a user selection of an area within a displayed instance of a previous design and a circuit element module that identifies a plurality of circuit elements located in the user selected area. In such embodiments, the import module further imports the identified plurality of circuit elements located in the user selected area into the current board design.

In some embodiments, the apparatus includes a rules module that identifies one or more design rules associated with the selected portion of a board design. In such embodiments, the import module further imports the identified one or more design rules into the current board design. In some embodiments, the apparatus includes a structure module that identifies one or more supporting structures associated with the selected portion of a board design. In such embodiments, the import module further imports the one or more supporting structures into the current board design.

In certain embodiments, the search module searches a database for the identified PCB component, the database including a plurality of board files. In such embodiments, the one or more instances of previous board designs containing the identified PCB component are results of the search. In certain embodiments, the search module presents the results of the search in chronological order based on dates the previous board designs. In such embodiments, a more recent previous board design containing the identified PCB component may be presented ahead of a less recent previous board design containing the identified PCB component.

In some embodiments, the apparatus includes an editor module that provides a design interface for the current board. In such embodiments, the current board design is editable via the board design interface, with the editor module enabling modification of the imported component. In certain embodiments, the editor module further receives a component selection via the board design interface. In such embodiments, the component ID module identifies the PCB component from the component selection.

In certain embodiments, the search module displays a matching component in a previous board design and one or more layout features associated with the matching component. In some embodiments, the matching component shares with the identified components one or more of: pin assignments, PCB footprints, part number, and circuit type.

According to an embodiment of the present invention, a computer-implemented method for PCB design includes identifying a PCB component to be placed on a current board design and displaying one or more instances of previous board designs containing the identified PCB component. Here, displaying the one or more instances of previous board designs containing the identified PCB component includes displaying a region surrounding the identified PCB component. The method includes importing a selected portion of a board design into the current board design from a selected one of the instances of previous board designs containing the identified PCB component.

In certain embodiments, importing the selected portion of a board design into the current board design includes importing a matching PCB component in the selected instance of a previous board design and at least one of: a wiring feature associated with the matching PCB component and a layout feature associated with the matching PCB component. In certain embodiments, the selected portion of a board design comprises at least one of: a wiring feature associated with a matching PCB component in the selected instance of a previous board design and a layout feature associated with the matching PCB component.

In some embodiments, the computer-implemented method also includes receiving a user selection of an area within a displayed instance of a previous design and identifying a plurality of circuit elements located in the user selected area. In such embodiments, importing the selected portion of a board design into the current board design includes importing the plurality of circuit elements located in the user selected area.

In some embodiments, the computer-implemented also includes identifying one or more design constraints associated with the selected portion of a board design. In such embodiments, importing the selected portion of a board design into the current board design includes importing the one or more design constraints associated with the selected portion of a board design. In some embodiments, the computer-implemented method includes identifying one or more supporting structures associated with the selected portion of a board design. In such embodiments, importing the selected portion of a board design into the current board design includes importing the one or more supporting structures associated with the selected portion of a board design.

In some embodiments, the computer-implemented also includes searching a database for the identified PCB component, the database including a plurality of board files. In such embodiments, the one or more instances of previous board designs containing the identified PCB component are results of the search. In certain embodiments, displaying one or more instances of previous board designs includes presenting the results of the search in chronological order based on dates the previous board designs.

In some embodiments, the computer-implemented method also includes providing a board design interface, such that the current board design is editable via the board design interface, and receiving a component selection via the board design interface. In such embodiments, identifying the PCB component occurs in response to receiving the component selection. In some embodiments, the computer-implemented method includes identifying one or more layout features associated with the selected portion of a board design.

According to another embodiment of the present invention, a computer program product for PCB design includes a computer readable storage medium having program instructions embodied therewith. Here, the program instructions executable by a processor to cause the processor to: identify a PCB component to be placed on a current board design, display one or more instances of previous board designs containing the identified PCB component, and import a selected portion of a board design into the current board design from a selected one of the instances of previous board designs containing the identified PCB component. Here, displaying the one or more instances of previous board designs containing the identified PCB component includes displaying a region surrounding the identified PCB component.

FIG. 1 is a block diagram illustrating one embodiment of a system 100 for importing a PCB component and/or wiring/layout features associated with the PCB component into a board design. The system 100 includes a board design apparatus 102 in computer storage 104 in a computer 106 with a CPU 108 and memory 110, a computer network 112 and clients 114a-114n (collectively or individually "114"), which are described below.

The system 100 includes a board design apparatus 102, which identifies a printed circuit board ("PCB") component to be used in a current board design and displays one or more instances of previous board designs containing the identified PCB component. Here, displaying the one or more instances of previous board designs containing the identified PCB component include the board design apparatus 102 displaying a region surrounding the identified PCB component. The board design apparatus 102, in response to selection of a portion of a previous board design, may also import the selected portion of a board design into the current board design. The selected portion of a previous board design may include one or more of: a PCB component matching the identified PCB component, at least one wiring feature associated with the matching PCB component, and at least one layout feature associated with the matching PCB component. The board design apparatus 102 is described further in relation to the apparatuses 200, 300 of FIGS. 2 and 3.

While the board design apparatus 102 is depicted in computer storage 104, such as a hard disk drive, flash memory or other non-volatile storage, all or a portion of the board design apparatus 102 may be located elsewhere, such as in a storage area network, cloud storage, network attached storage or other computer data storage external to the computer 106. In addition, all or a portion of the board design apparatus 102 may be located in memory 110, such as cache, random access memory ("RAM") or other non-volatile memory 110 accessible by the central processing unit ("CPU") 108. The computer storage 104 may take the form of a hard disk drive, solid state storage, optical storage and the like or may be external to the computer 106.

The computer 106 may be a server, a workstation, a desktop computer, a laptop computer, a mainframe computer, or other computing device capable of running the board design apparatus 102. In some embodiments, the computer 106 is a dedicated computing device configured to operate, execute, etc. the board design apparatus 102. In some embodiments, the computer 106 includes one or more CPUs 108 or a CPU with two or more cores. In some embodiments, the board design apparatus 102 may run on a virtual machine in a partition configured using one or more CPUs or cores of a server. One of skill in the art will recognize other computers 106 capable of running the board design apparatus 102.

In some embodiments, the computer 106 is a server connected to one or more clients 114 through a computer network 112. The computer network 112 may include a LAN, a WAN, a fiber network, the Internet, a wireless network, or a combination of networks. A client 114 may be any form of computer capable of connecting to the server and may be used to control execution of the board design apparatus 102. One of skill in the art will recognize other computers 106 and computing environments appropriate for execution of the board design apparatus 102. In addition, all or a portion of the board design apparatus 102 may be implemented using hardware circuits and/or a programmable hardware device. For example, all or a portion of the board design apparatus 102 may be implemented using an FPGA. In another example, all or a portion of the board design apparatus 102 may be implemented using one or more hardware circuits. One of skill in the art will recognize other ways that the board design apparatus 102 may be implemented.

Figure 2:
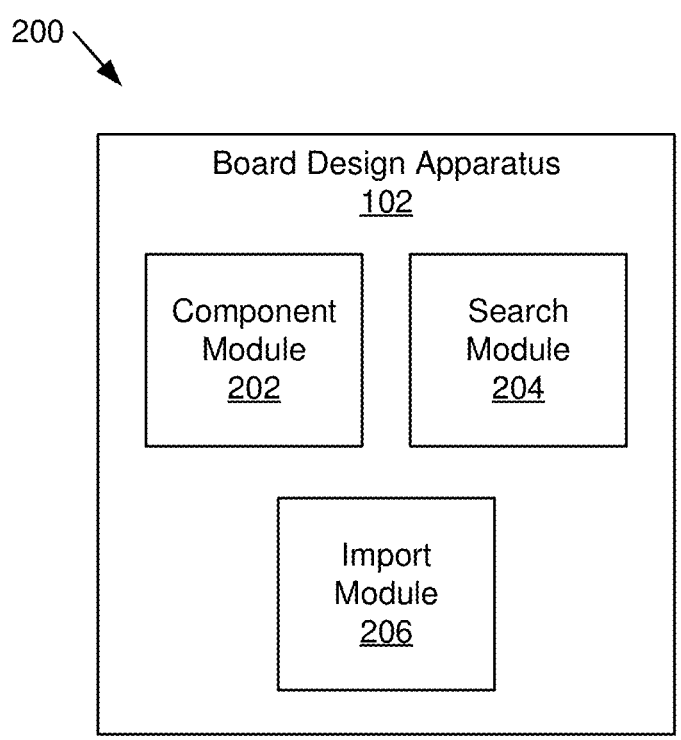
FIG. 2 is a block diagram illustrating one embodiment of an apparatus for importing a PCB component into a board design.

FIG. 2 is a block diagram illustrating one embodiment of an apparatus 200 for importing a PCB component and/or wiring/layout features associated with the PCB component into a board design file. The apparatus 200 includes one embodiment of the board design apparatus 102 that includes a component ID module 202, a search module 204, and an import module 206, which are described in more detail below.

The component ID module 202, in one embodiment, identifies a PCB component to be used in a current board design. Here, the identified PCB component may be an electronic component (such as a parent component, a child component, an integrated circuit, a circuit element, and the like), supporting structure of an electronic component (such as electrical connections, vias, pads, pins, traces, physical supports, routing, connectors, interconnects, junctions, nodes, grounds, and the like), or other PCB features.

In one embodiment, a user (e.g., the designer) selects a component in a PCB design file. Here, the component ID module 202 may identify the selected component. In various embodiments, the identified component and the selected component share one or more of: pin assignments, PCB footprints, part number, circuit type, and the like.

In another embodiment, a user (e.g., the designer) enters a query for a particular PCB component. Here, the component ID module 202 may identify the queried component. In various embodiments, the identified component shares with the queried component one or more of: pin assignments, PCB footprints, part number, circuit type, and the like.

The search module 204, in one embodiment, displays one or more instances of previous board designs containing the identified PCB component. Here, the search module 204 receives an indication of the identified PCB component (e.g., from the component ID module 202) and, in some embodiments, performs a search to find one or more instances of the identified PCB component in previous designs. For example, the search module 204 may search a database of previous designs (e.g., a database including a plurality of board files) for instances where the identified PCB component was previously used in the board design. The search module 204 presents its search results to the user. In such embodiments, the one or more instances of previous board designs containing the identified PCB component are results of the search. In certain embodiments, only certain types of board designs are searched for matching components. In certain embodiments, only certified board designs are searched.

In various embodiments, displaying the one or more instances of previous board designs containing the identified PCB component includes displaying a region surrounding the identified PCB component. For example, the presented search results may include an image of the instance of the identified PCB component (also referred to as a "matching component") and a region surrounding the matching component. Here, the region surrounding the matching component may show the matching component, its layout and supporting features, so that the user can make an accurate determination of whether the matching component (and/or its supporting features) should be imported into the current board design. In various embodiments, the matching component may share with the identified component one or more of: pin assignments, PCB footprints, part number, circuit type, and the like.

In certain embodiments, the search module 204 presents the results of the search in chronological order based on dates the previous board designs. In such embodiments, a more recent previous board design containing the identified PCB component may be presented ahead of a less recent previous board design containing the identified PCB component. In certain embodiments, the search module 204 presents a link to the previous board design having matching component. In certain embodiments, the search module 204 presents a text summary of the previous board design, thus giving a user (designer) context for a previous board design created by a different user/designer.

The import module 206, in one embodiment, imports a selected portion of a board design into the current board design from a selected one of the instances of previous board designs containing the identified PCB component. In various embodiments, the selected portion of a board design may correspond to a user selection of one or more components and/or features found in the previous board design. Here, the selected portion of a board design may be a matching component and/or one or more supporting features of a matching component (e.g., wiring features, layout features, etc.). As noted above, a "matching component" may share with the identified PCB component one or more of: pin assignments, PCB footprints, part numbers, and circuitry, etc.

In some embodiments, the import module 206 imports a selected region of the previous board design, the selected region including the selected component. In certain embodiments, the search module 204 displays a matching component in a previous board design and one or more layout features associated with the matching component. In such embodiments, importing a selected portion of a board design into the current board design may include the import module 206 importing the matching component and/or selected ones of the one or more layout features. In certain embodiments, the search module 204 displays a matching component in a previous board design and one or more wiring features associated with the matching component. In such embodiments, importing a selected portion of a board design into the current board design includes the import module 206 importing the matching component and/or selected ones of the one or more wiring features. Additionally, the import module 206 may import one or more of: design constraints, design rules, and the like into the current board design.

In some embodiments, the import module 206 imports PCB features (e.g., wiring feature(s), layout feature(s), etc.) without importing the matching component. For example, the designer may have placed a PCB component into the board design and is ready to place features associated with the PCB component. As such, the designer may select the placed PCB component to search for matching instances in previous designs, as discussed above. In such embodiments, importing the PCB features may include associating the imported PCB features with the selected PCB component. Moreover, the import module 206 may place the imported features into the current board design at location based on the selected component.

Figure 3:
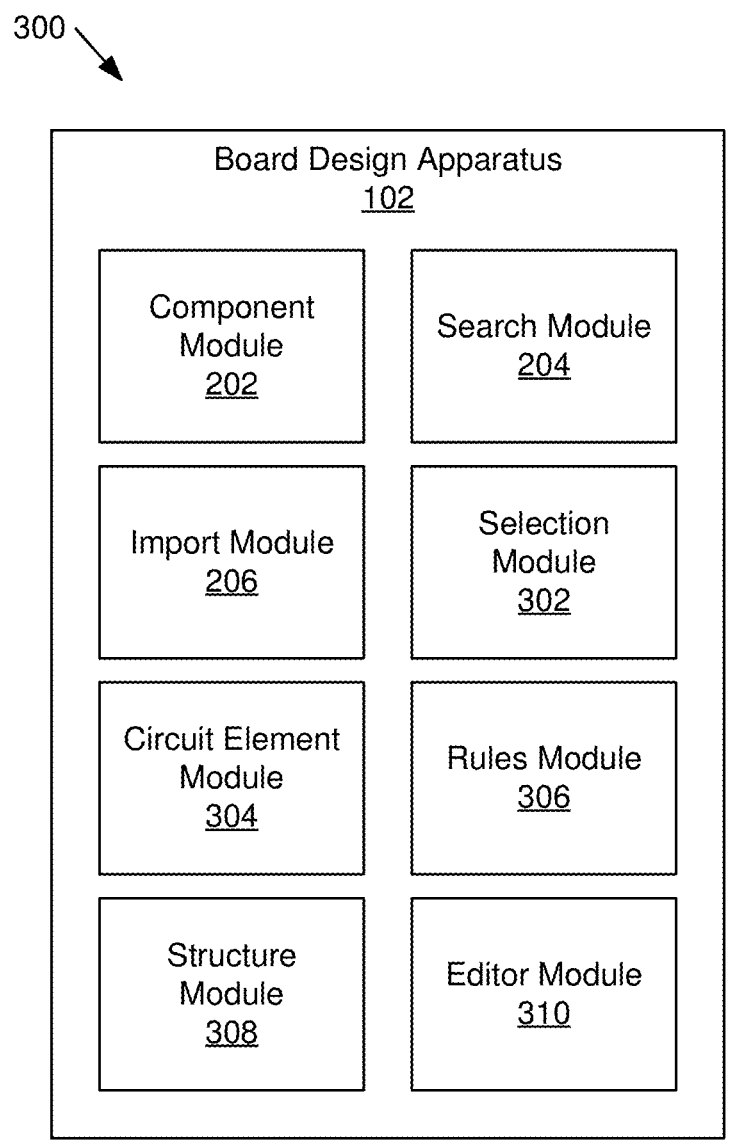
FIG. 3 is a block diagram illustrating another embodiment of an apparatus for importing a PCB component into a board design.

FIG. 3 is a block diagram illustrating another embodiment of an apparatus 300 for importing a PCB component into a board design. The apparatus 300 includes another embodiment of the board design apparatus 102 with a component ID module 202, a search module 204, and an import module 206, which are substantially similar to those described above in relation to the apparatus 200 of FIG. 2. The apparatus 300 also includes a selection module 302, a circuit element module 304, a rules module 306, a structure module 308, and/or an editor module 310, which are described below.

The selection module 302, in one embodiment, receives a user selection of an area within a displayed instance of a previous design. As noted above, the search module 204 may present to the user one or more search results, each search result displaying a region in the previous board design having the identified PCB component. The selection module 302 allows the designer to select an area within the displayed region.

In one embodiment, the user selected area may include the matching component. In another embodiment, the user selected area excludes the match component. The user selected area may be rectangular, circular, polygonal, freeform, or the like. In one example, the designer uses the cursor to "lasso" an area within the displayed instance.

In one embodiment, a user may click on the search result, wherein the board design apparatus 102 presents a magnified and/or expanded image containing a region surrounding the matching component in the previous board design. In one example, the magnified/expanded image is presented in a pop-up window. A magnified image allows the designer finer control in defining the user selected area. An expanded image allows the designer to capture a greater number of useful features within the user selected area.

The circuit element module 304, in one embodiment, identifies a plurality of circuit elements located in the user selected area. In such embodiments, the import module 206 further imports the identified plurality of circuit elements located in the user selected area into the current board design. As used herein, a circuit element may be a trace, a connection, an integrated circuit, a transistor, a capacitor, a resistor, an inductor, a via, or the like. Moreover, the circuit element module 304 may identify one or more supporting structures or other PCB features within the user selected area, so that the import module 206 also imports these identified structures/features.

The rules module 306, in one embodiment, identifies one or more design rules associated with the selected portion of a board design (e.g., the matching component and/or supporting features of the matching component). In such embodiments, the import module 206 further imports the identified one or more design rules into the current board design. Here, the design rules may include design constraints, such as mechanical constraints, electrical constraints, thermal constraints, and the like. Examples of design constraints include limitations (e.g., maximum or minimum values) for trace length, height restrictions, signal loss, insertion loss propagation delay, and the like. Other design rules include not placing a component directly on top of another component, height restrictions, edges of the PCB, spacing between components, and the like. In one example, a design rule may be a minimum distance between electrical components.

The structure module 308, in one embodiment, identifies one or more supporting structures associated with the selected portion of a board design. In such embodiments, the import module 206 further imports the one or more supporting structures into the current board design. As discussed above, a supporting structure may be a mechanical support, a mechanical connection, holes, slots, cutouts, pads, thermal management features, and the like.

The editor module 310, in one embodiment, provides a design interface for the current board. In such embodiments, the current board design is editable via the design interface, with the editor module 310 enabling modification of the imported component. For example, the editor module 310 may allow for placement of the imported component. The editor module 310 may also allow for adjustment of the fanout, component layout, pin layout, copper layer, and the like for the current board design.

In certain embodiments, the editor module 310 further receives a component selection via the board design interface. In such embodiments, the component ID module 202 identifies the PCB component from the component selection. As discussed above, a designer may select a component in the current board design to be placed on the PCB. The selection may then trigger (e.g., after receiving additional command) identification of the selected component and a search for matching components in previous board design files.

Figure 4:
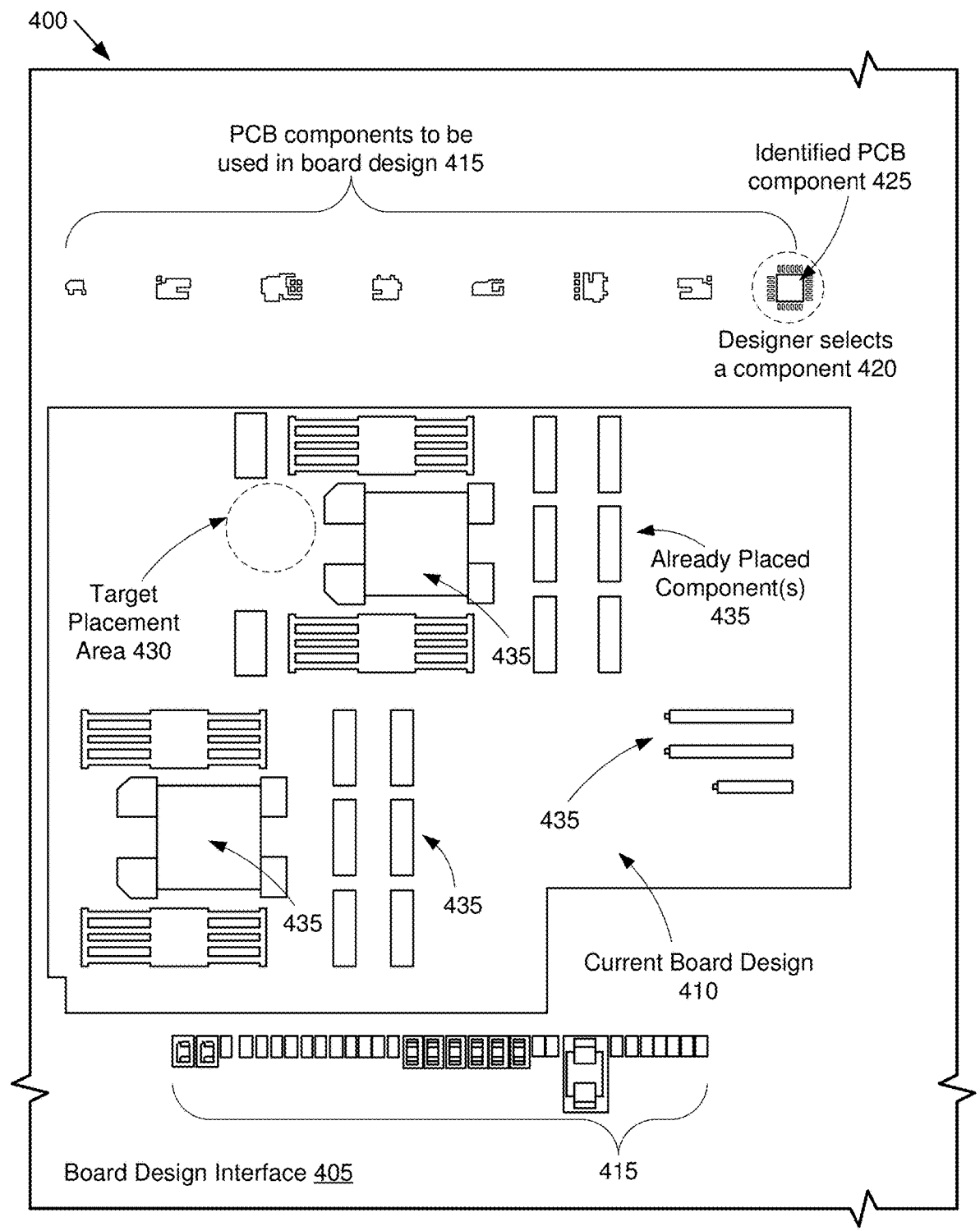
FIG. 4 is a diagram illustrating a board design interface and current board design.

FIG. 4 is a diagram 400 illustrating a board design interface 405 and current board design 410, according to embodiments of the disclosure. The board design interface 405 comprises one or more tools for interacting with previous board designs and the current board file. The board design interface 405 may be one embodiment of the board design apparatus 102. The board design interface 405 allows a user (e.g., a designer) to select among search the design features for multiple board files. Moreover, the board design interface 405 imports selected features into the current design file (e.g., using design to import functions). Additionally, the granularity of the returned results (e.g., matching board features) allows the designer to select features regionally within the results for importation into the current board file being designed, as described below in greater detail.

As depicted in FIG. 4, the board design interface 405 has loaded the current board file and is in the normal design phase of placing components, fanning out components, and the like. As shown, the current board file being edited by the board design interface 405 includes one or more PCB components 415 to be used in the current board design 410. In some embodiments, the current board design 410 may include one or more already placed components 435.

The board design interface 405 receives, e.g., from the designer, selection 420 of a component. In certain embodiments, the board design interface 405 provides a selection tool (not shown). Here, the designer uses the selection tool to select a PCB component present in the current board file. While FIG. 4 shows the selection being from the PCB components 415 to be used in the board design, in other embodiments the designer may select an already placed component 435. The board design interface 405 identifies a PCB component 425 based on the designer's selection.

In certain embodiments, the board design interface 405 provides a search tool (not shown). The designer may use the search tool to search for a PCB component. Here, the designer may input a query with one or more search terms. Here, the search terms may be a part number, a component type, and the like. In such embodiments, the board design interface 405 identifies a PCB component 425 corresponding to the search query.

As discussed in further detail with reference to FIGS. 5-8, the board design interface 405 presents objects matching the identified PCB component 425 to the designer, where the designer selects one or more features from the matching objects. Moreover, the board design interface 405 imports the selected features into the current board file, for example placing the imported features at a target placement area 430 in the current board design 410.

In certain embodiments, the board design interface 405 imports features selected from a plurality of matching objects. For example, the board design interface 405 may merge selected features from two or more previous imitations of the identified PCB component 425. Here, the designer may select a first subset of features from a first matching object and a second subset of features from a second matching object and use board design rules to merge the two subsets of features. Thereafter, the merged features may be imported into the current board file (e.g., placed on the current board design 410). Imported features may include, but are not limited to fanouts, copper traces, copper shapes, vias, circuit elements, support structures, subcomponents, child components, and the like.

Figure 5:
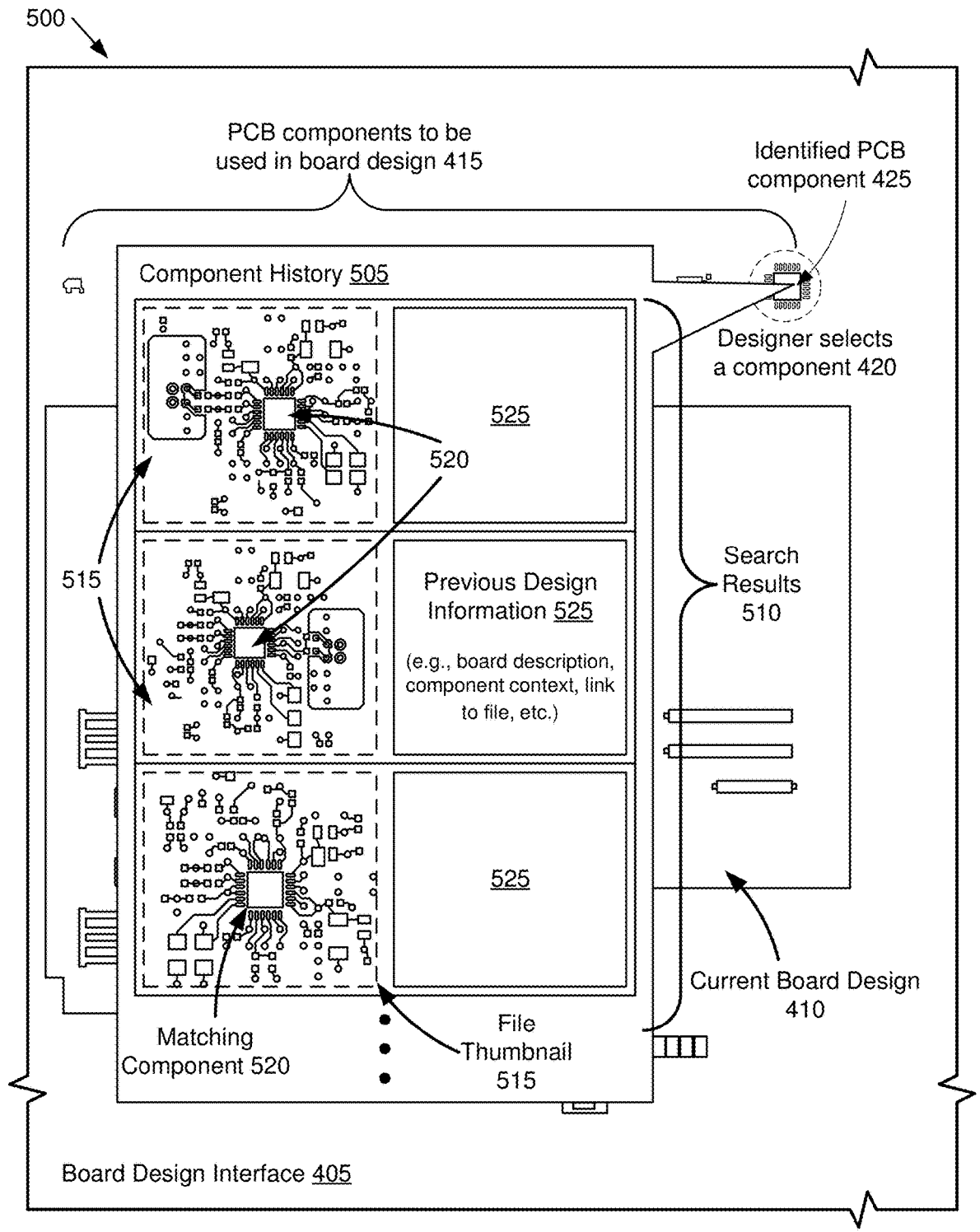
FIG. 5 is a diagram illustrating board design interface and matching components.

FIG. 5 is a diagram 500 illustrating the board design interface 405 displaying matching components, according to embodiments of the disclosure. In response to the selection 420 of a component (e.g., by the designer), the board design interface 405 identifies, from the selection, a PCB component 425. The board design interface 405 searches a database (e.g., library of design files) for instances of matching components 520 in previous board designs. The instance of a matching component and the features associated with the matching component are referred to as a "matching object."

In some embodiments, the board design interface 405 presents a component history 505 to the designer. Here, the component history 505 includes a plurality of search results 510, including physical layouts from previous board designs. The search results 510 include a file thumbnail 515, which is an image of the matching component 520 and its associated features (e.g., an image of the matching object). In certain embodiments, the search results 510 may include previous design information 525, such as board descriptions, links to the board file, or other information giving context to the matching component 520. Where multiple matching objects are discovered, the board design interface 405 may sort the found objects chronologically (e.g., a matching object from a newer design being shown ahead of a matching object from an older design).

From the component history 505, the designer may select one or more matching components 520 and associated features for importation into the current board file. In certain embodiments, the board design interface 405 provides a feature selection tool for selecting various features (including a matching component 520) found in a matching object. In certain embodiments, the board design interface 405, in response to the user selecting a search result 510, provides a magnified/enhanced view of the matching object in the search result 510.

Figure 6:
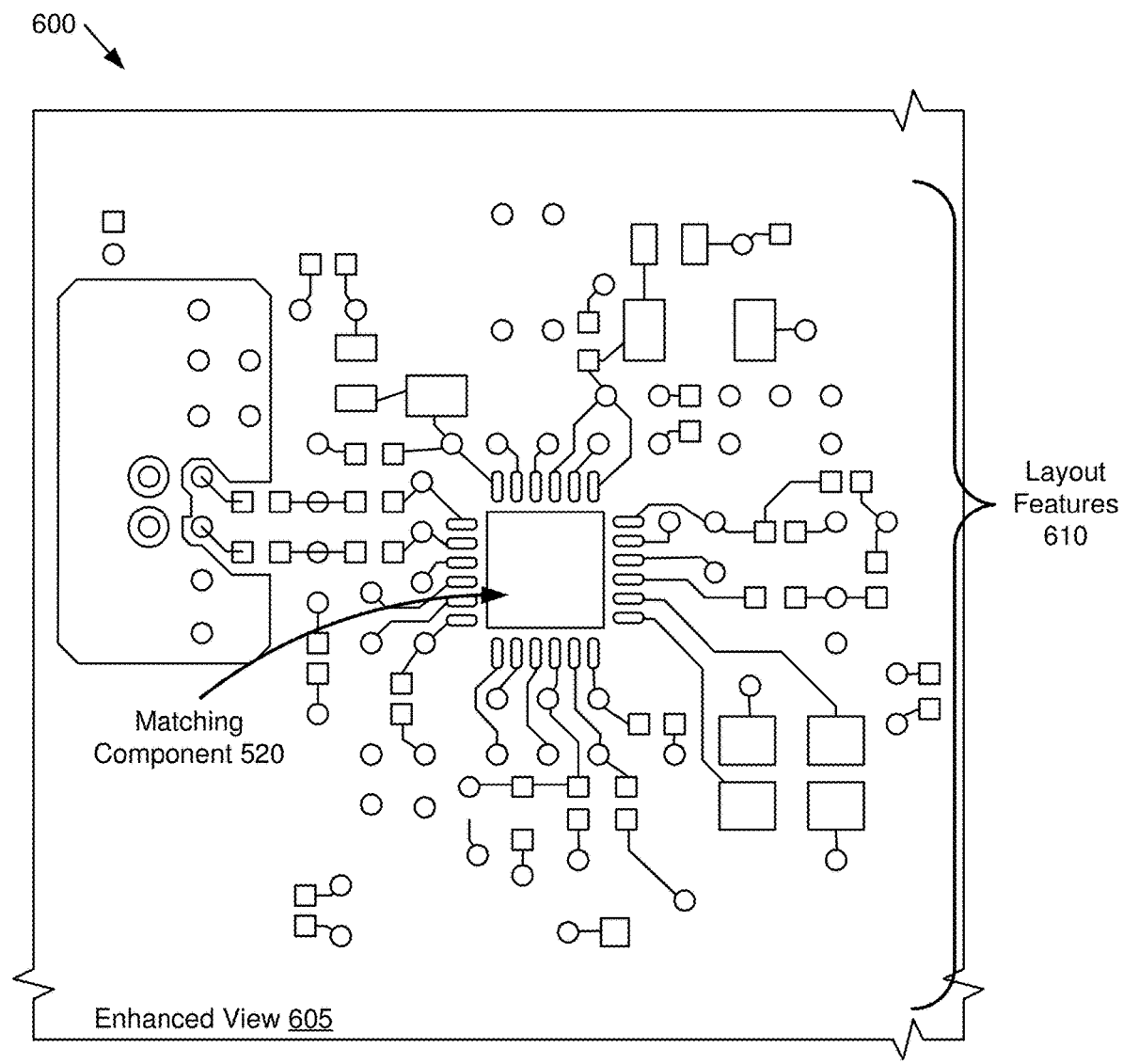
FIG. 6 is a diagram illustrating one embodiment of a matching component and corresponding layout features.

FIG. 6 is a diagram 600 illustrating an enhanced view 605 of a matching component 520 and wiring/layout features 610 that correspond to the matching component 520, according to embodiments of the disclosure. As depicted, the wiring/layout features 610 may include one or more of child components, traces, pads, vias, circuit elements, connectors, support structures, and the like.

Figure 7:
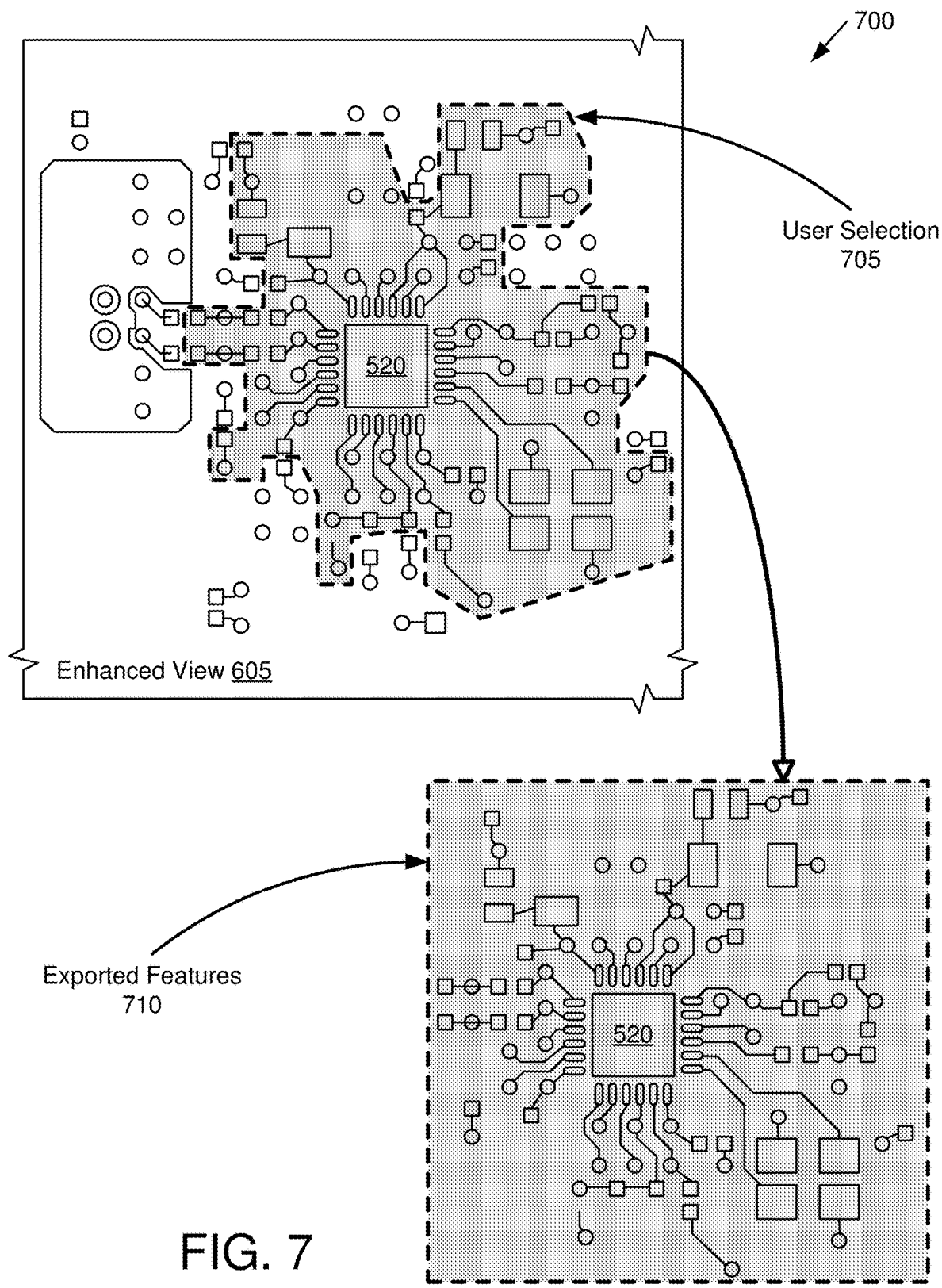
FIG. 7 is a diagram illustrating one embodiment of a user selection of PCB components/features.

FIG. 7 is a diagram 700 illustrating a user selection 705 of a portion of the board design within the enhanced view 605. In various embodiments, the board design interface 405 provides a feature selection tool so that the designer may define a region in the enhanced view 605. This region corresponds to the user selection 705. In some embodiments, the user selection 705 may include the matching component 520. In certain embodiments, the user selection 705 may include a subset of the wiring/layout features 610 that correspond to the matching component 520. From the user selection 705, the board design interface 405 derives exported components/features 710. In the depicted embodiment, the exported component/features 710 include the matching component 520 and a subset of the corresponding layout features 610. However, in other embodiments the exported features may exclude the matching component 520. For example, the exported components/features 710 may include some or all of the layout features 610 and not include the matching component 520.

Figure 8:
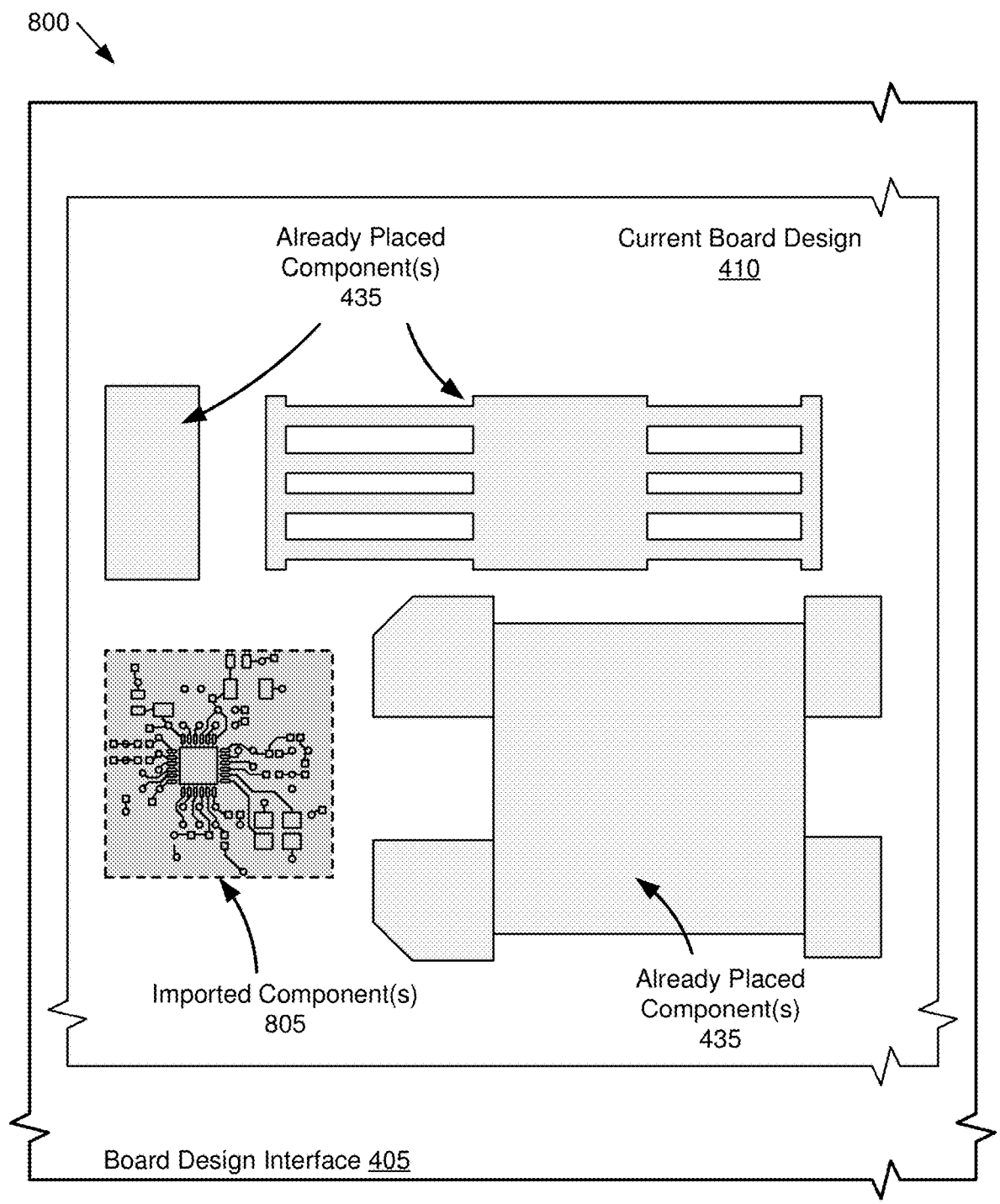
FIG. 8 is a diagram illustrating one embodiment of importation of a selected portion of a board design to the current board design.

FIG. 8 is a diagram 800 illustrating importation of a selected portion of a board design to the current board design, according to embodiments of the disclosure. Here, the board design interface 405 imports one or more selected components/features 805 onto the current board design 410. As depicted, the imported components/features 805 may be placed near already placed components 435, for example placing the location corresponding to the target placement area 430 discussed above. Where wiring/layout features are imported for one of the already placed components 435, these may be placed around the appropriate component 435.

In some embodiments, the board design interface 405 imports various design rules and/or design constraints associated with the imported components 805. Note that the imported components 805 correspond to the exported features 710. From the previous board file containing the exported features 710, the board design interface 405 may identify and import the various design rules and/or design constraints. One example of a design constraint are limitations relating to placement of one via next to another via. Another example of a design constraint are geometric requirements, e.g., for a trace, so that impedance requirements are adhered to. Moreover, the board design interface 405 may additionally import supporting structures, pin assignments, element locations, copper layer features, and the like from the previous board file.

Figure 9:
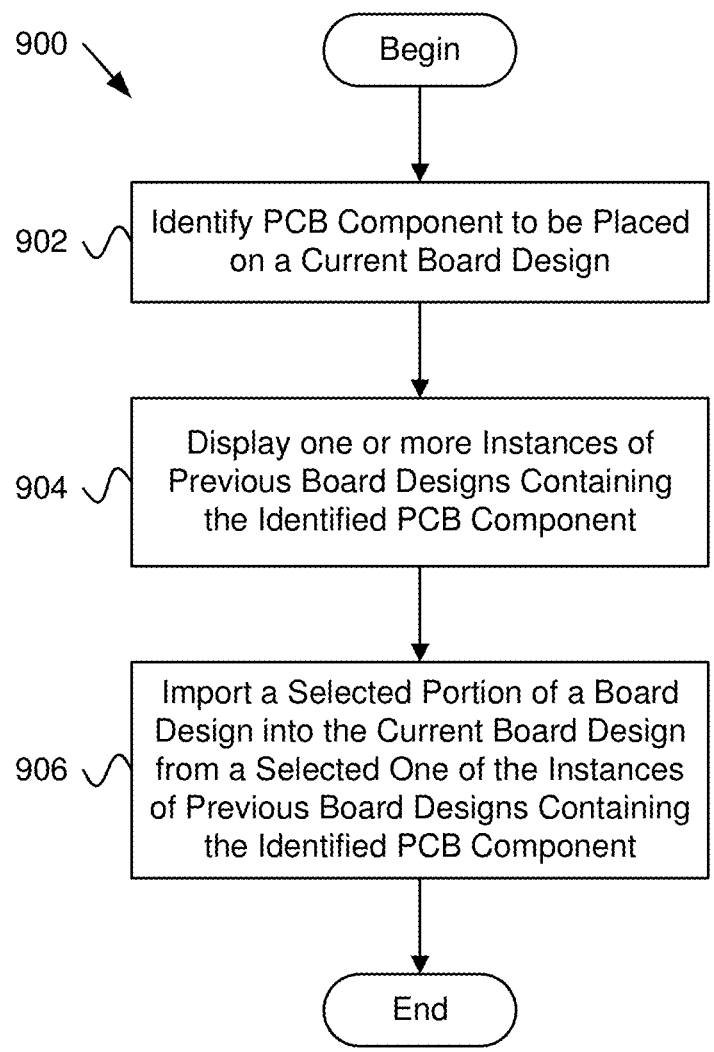
FIG. 9 is a flow chart diagram illustrating one embodiment of a method for importing a PCB component into a board design.

FIG. 9 is a flow chart diagram illustrating one embodiment of a method 900 for importing a PCB component. In various embodiments, the method 900 may be implemented by the board design apparatus 102 and/or the board design interface 405. In certain embodiments, the method 900 may be performed by a processor executing program code, for example, a microcontroller, a microprocessor, a CPU, a GPU, an auxiliary processing unit, a FPGA, or the like.

The method 900 begins and identifies 902 a PCB component to be placed on a current board design. The method 900 includes displaying 904 one or more instances of previous board designs containing the identified PCB component. Here, displaying the one or more instances of previous board designs containing the identified PCB component includes displaying a region surrounding the identified PCB component.

The method 900 includes importing 906 a selected portion of a board design into the current board design from a selected one of the instances of previous board designs containing the identified PCB component. The method 900 ends. In certain embodiments, the steps of the method 900 may be performed by the component ID module 302, the search module 304 and the import module 306.

Figure 10:
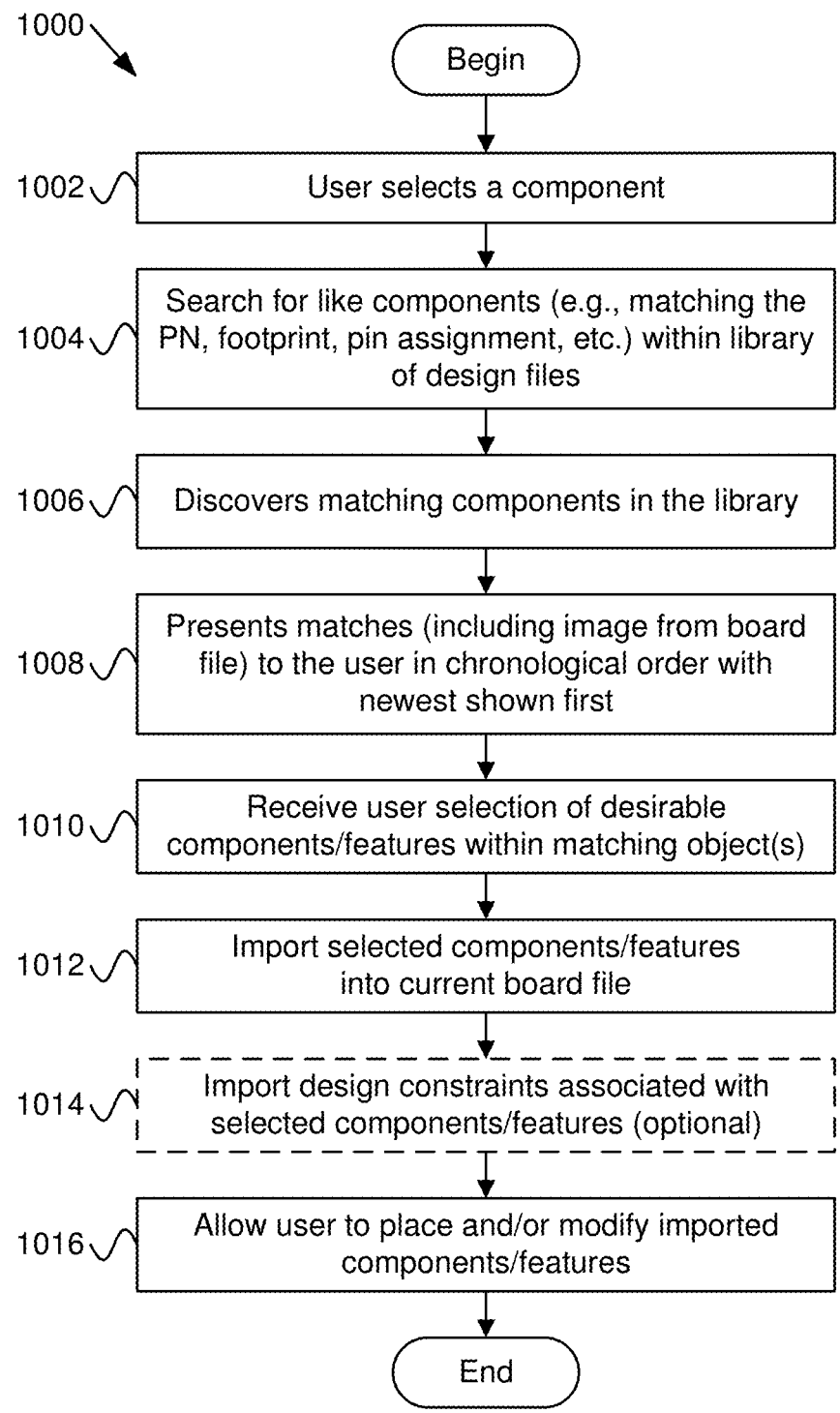
FIG. 10 is a flow chart diagram illustrating another embodiment of a method for importing a PCB component into a board design.

FIG. 10 is a flow chart diagram illustrating one embodiment of a method 1000 for importing a PCB component. In various embodiments, the method 1000 may be implemented by the board design apparatus 102 and/or the board design interface 405. In certain embodiments, the method 1000 may be performed by a processor executing program code, for example, a microcontroller, a microprocessor, a CPU, a GPU, an auxiliary processing unit, a FPGA, or the like.

The method 1000 begins and the user selects 1002 a component. In one embodiment, selecting 1002 the component includes the user clicking on a desired component within a current board file. In a further embodiment, selecting 1002 the component includes using a selection tool to select the component. Alternatively, the user may query for a certain component using keywords, such as part number, type, etc. Here, selecting 1002 the component may include identifying the search query. In certain embodiments, the user may be presented with one or more candidates which match the search query. In such embodiments, the user may select 1002 a component from the presented candidates.

The method 1000 includes searching 1004 for like components within a library of design files. Here, searching 1004 for the like components includes searching for components which match the part number, footprint, pin assignment, or similar characteristics of the selected component (alternatively, of the queried component). In some embodiments, the library of design files is a cloud-based database. In some embodiments, the library of design files includes design file stored on various local clients accessible by the board design apparatus 102.

The method 1000 includes discovering 1006 at least one matching component from the library and presenting 1008 matches to the user in chronological order with newish shown first. Here, presenting 1008 the matches includes presenting an image from the respective board files, set image including the matching components and one or more features associated with the matching component. The matching component and associated features are referred to as a matching object.

The method 1000 includes receiving 1010 a user selection of desirable components/features within one or more matching objects. In some embodiments, the method 1000 provides a selection tool whereby the user/designer may define a region, such as a polygon, rectangle, circle, oval, or the like. Here, receiving 1010 the user selection includes identifying a region defined by the selection tool and identifying the PCB features included in the user defined region.

The method 1000 includes importing 1012 the selected components/features into the current board file. In some embodiments, importing 1012 the selected components/features may include maintaining relative locations of the components/features. In some embodiments, importing 1012 the selected components/features may include maintaining characteristics of the components/features, such as sizes, impedances, capacitances, trace length, pin arrangements, and the like.

The method 1000, in some embodiments, includes importing 1014 design constraints associated with the selected components/features. For example, the user/designer may indicate a desire to import the design constraints into the current design file. In one embodiment, importing 1014 for the design constraints may occur automatically with importation of the selected features if the user/designer has enabled this feature (e.g., via settings, preferences, user profile, etc.). The method 1000 includes allowing 1016 the user/designer to place and/or modify the important features. The method 1000 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
 a component ID module that receives, using a printed circuit board ("PCB") design interface of a PCB design application, a user selection of a a PCB component to be placed on a PCB of a current board design;
 a search module that displays, using the PCB design interface, one or more instances of previous board designs containing the selected PCB component, the previous board designs for different PCBs, wherein displaying the one or more instances of previous board designs containing the selected PCB component comprises displaying a region surrounding the selected PCB component;
 a selection module that, in response to the user selecting, using the PCB design interface, an instance of the one or more instances of previous board designs containing the selected PCB component, receives a user selection of an area within the selected instance of a previous design;
 a circuit element module that identifies a plurality of circuit elements located in the user selected area; and
 an import module that imports, using the PCB design interface, a selected portion of a board design comprising the selected PCB component and the identified plurality of design elements located in the user selected area into the current board design from the selected instance of the instances of the previous board designs containing the selected PCB component, wherein at least a portion of said modules comprise one or more of: hardware circuits, a programmable hardware device and executable code, the executable code stored on one or more computer readable storage media.

2. The apparatus of claim 1, wherein importing the selected portion of a board design into the current board design comprises the import module importing a matching PCB component in the selected instance of a previous board design and at least one of: a wiring feature associated with the matching PCB component and a layout feature associated with the matching PCB component.

3. The apparatus of claim 1, wherein importing the selected portion of a board design into the current board design comprises the import module importing at least one of: a wiring feature associated with a matching PCB component in the selected instance of a previous board design and a layout feature associated with the matching PCB component.

4. The apparatus of claim 1, further comprising:
a rules module that identifies one or more design rules associated with the selected portion of a board design,
wherein the import module further imports the identified one or more design rules into the current board design.

5. The apparatus of claim 4, wherein the search module presents the results of the search in chronological order based on dates the previous board designs, wherein a more recent previous board design containing the selected PCB component is presented ahead of a less recent previous board design containing the selected PCB component.

6. The apparatus of claim 1, further comprising:
a structure module that identifies one or more supporting structures associated with the selected portion of a board design,
wherein the import module further imports the one or more supporting structures into the current board design.

7. The apparatus of claim 1, wherein the search module searches a database for the selected PCB component, the database comprising a plurality of board files, wherein the one or more instances of previous board designs containing the selected PCB component are results of the search.

8. The apparatus of claim 1, further comprising an editor module that provides a design interface for the current board, wherein the current board design is editable via the design interface, wherein the editor module enables modification of the imported component.

9. The apparatus of claim 8, wherein the editor module further receives a component selection via the design interface, wherein component ID module identifies the PCB component from the component selection.

10. The apparatus of claim 1, wherein the search module displays a matching component in a previous board design and one or more layout features associated with the matching component, wherein the matching component shares with the selected PCB component one or more of: pin assignments, PCB footprints, part number, and circuit type.

11. A computer-implemented method comprising:
receiving, using a printed circuit board ("PCB") design interface of a PCB design application, a user selection of a PCB component to be placed on a PCB of a current board design;
displaying, using the PCB design interface, one or more instances of previous board designs containing the selected PCB component, the previous board designs for different PCBs, wherein displaying the one or more instances of previous board designs containing the selected PCB component comprises displaying a region surrounding the selected PCB component;
in response to the user selecting, using the PCB design interface, an instance of the one or more instances of previous board designs containing the selected PCB component, receiving a user selection of an area within the selected instance of a previous design;
identifying a plurality of circuit elements located in the user selected area; and
importing, using the PCB design interface, a selected portion of a board design comprising the selected PCB component and the identified plurality of design elements located in the user selected area into the current board design from the selected instance of the instances of previous board designs containing the selected PCB component.

12. The computer-implemented method of claim 11, wherein importing the selected portion of a board design into the current board design comprises importing a matching PCB component in the selected instance of a previous board design and at least one of: a wiring feature associated with the matching component and a layout feature associated with the selected PCB component in the matching instance of a previous board design.

13. The computer-implemented method of claim 11, wherein the selected portion of a board design comprises at least one of: a wiring feature associated with a matching PCB component in the selected instance of a previous board design and a layout feature associated with the matching PCB component.

14. The computer-implemented method of claim 11, further comprising:
receiving a user selection of an area within a displayed instance of a previous design; and
identifying a plurality of circuit elements located in the user selected area,
wherein importing the selected portion of a board design into the current board design comprises importing the plurality of circuit elements located in the user selected area.

15. The computer-implemented method of claim 11, further comprising:
identifying one or more of: a design constraint associated with the selected portion of a board design and a supporting structure associated with the selected portion of a board design,
wherein importing the selected portion of a board design into the current board design comprises importing the one or more of: a design constraint associated with the selected portion of a board design and a supporting structure associated with the selected portion of a board design.

16. The computer-implemented method of claim 15, wherein displaying one or more instances of previous board designs comprises presenting the results of the search in chronological order based on dates of the previous board designs.

17. The computer-implemented method of claim 11, further comprising searching a database for the selected PCB component, the database comprising a plurality of board files, wherein the one or more instances of previous board designs containing the selected PCB component are results of the search.

18. The computer-implemented method of claim 11, further comprising:

providing a board design interface, wherein the current board design is editable via the board design interface; and receiving a component selection via the board design interface, wherein identifying the PCB component occurs in response to receiving the component selection.

19. A computer program product for printed circuit board ("PCB") design, the computer program product comprising a computer readable storage medium having program instructions embodied therewith, the program instructions executable by a processor to cause the processor to:

receiving, using a PCB design interface of a PCB design application, a user selection of a PCB component to be placed on a PCB of a current board design;

display, using the PCB design interface, one or more instances of previous board designs containing the selected PCB component, the previous board designs for different PCBs, wherein displaying the one or more instances of previous board designs containing the selected PCB component comprises displaying a region surrounding the selected PCB component;

in response to the user selecting, using the PCB design interface, an instance of the one or more instances of previous board designs containing the selected PCB component, receive a user selection of an area within the selected instance of a previous design;

identify a plurality of circuit elements located in the user selected area; and import, using the PCB design interface, a selected portion of a board design comprising the selected PCB component and the identified plurality of design elements located in the user selected area into the current board design from the selected instance of the instances of previous board designs containing the selected PCB component.

* * * * *